United States Patent
Stegelmann

(10) Patent No.: US 6,766,937 B2
(45) Date of Patent: Jul. 27, 2004

(54) ULTRASONIC ROTARY HORN REPAIR

(75) Inventor: Norman R. Stegelmann, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/325,084

(22) Filed: Dec. 20, 2002

(65) Prior Publication Data

US 2004/0118901 A1 Jun. 24, 2004

(51) Int. Cl.$^7$ ............... B23K 5/20; B23K 1/06; B32P 19/04; B32P 6/00
(52) U.S. Cl. ............... 228/1.1; 228/110.1; 156/73.1; 156/580.1; 29/402.06; 29/402.07; 29/402.11
(58) Field of Search ............... 156/73.1, 580.1, 156/580.2; 228/110.1, 119, 165, 234.1, 1.1; 29/895.1, 895.3, 402.01, 402.06, 402.07, 402.11

(56) References Cited

U.S. PATENT DOCUMENTS

| | | |
|---|---|---|
| 3,937,990 A | 2/1976 | Winston |
| 4,063,939 A | 12/1977 | Weaver et al. |
| 4,152,816 A | 5/1979 | Ewing et al. |
| 4,249,986 A | 2/1981 | Obeda |
| 4,499,845 A | 2/1985 | Pope |
| 4,704,336 A | 11/1987 | Spriggs |
| 4,749,437 A | 6/1988 | Welter |
| 4,756,180 A * | 7/1988 | Higuchi et al. ............... 72/199 |
| 4,983,339 A | 1/1991 | Boncoeur et al. |
| 5,087,320 A | 2/1992 | Neuwirth |
| 5,599,411 A * | 2/1997 | Schembri ............... 156/73.1 |
| 5,855,706 A | 1/1999 | Grewell |
| 5,873,703 A | 2/1999 | Kelly et al. |
| 5,931,367 A * | 8/1999 | Sato et al. ............... 228/1.1 |
| 5,976,205 A * | 11/1999 | Andrews et al. ............... 51/307 |
| 6,059,923 A | 5/2000 | Gopalakrishna |
| 6,109,502 A | 8/2000 | Sato |
| 6,241,036 B1 | 6/2001 | Lovato et al. |

FOREIGN PATENT DOCUMENTS

| | | | |
|---|---|---|---|
| JP | 03234250 | | 10/1991 |
| JP | 04309495 | | 11/1992 |
| JP | 09058621 | | 3/1997 |
| JP | 09173344 | | 7/1997 |
| JP | 10052768 | | 2/1998 |
| JP | 11029378 A2 | | 2/1999 |
| JP | 11314168 | | 11/1999 |
| JP | 2002-096024 A | * | 4/2002 |
| JP | 2002096024 | | 4/2002 |
| WO | WO 02/07659 A2 | | 1/2002 |

OTHER PUBLICATIONS

U.S. patent application Ser. No. 10/324,936, Stegelmann, filed Dec. 2002.*
International Search Report from PCT/US03/16496 dated Aug. 27, 2003.

* cited by examiner

Primary Examiner—L. Edmondson
(74) Attorney, Agent, or Firm—Senniger, Powers, Leavitt & Roedel

(57) ABSTRACT

An ultrasonic rotary horn is repaired by removal of deteriorated metal condition from the horn energy transfer surface, and application and consolidation of metal powder to the horn radial surface. An ultrasonic rotary horn having a repaired radial energy transfer surface.

23 Claims, 2 Drawing Sheets

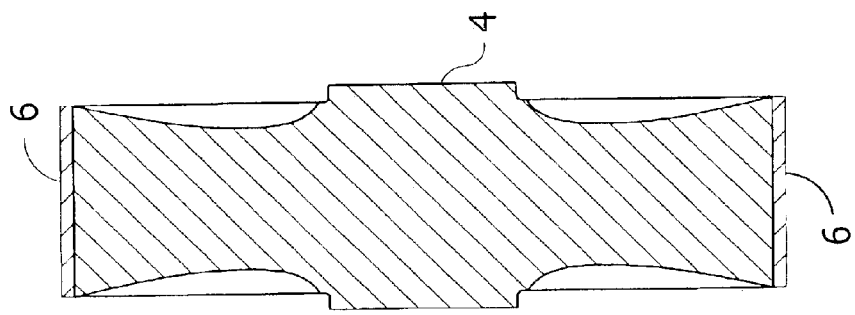
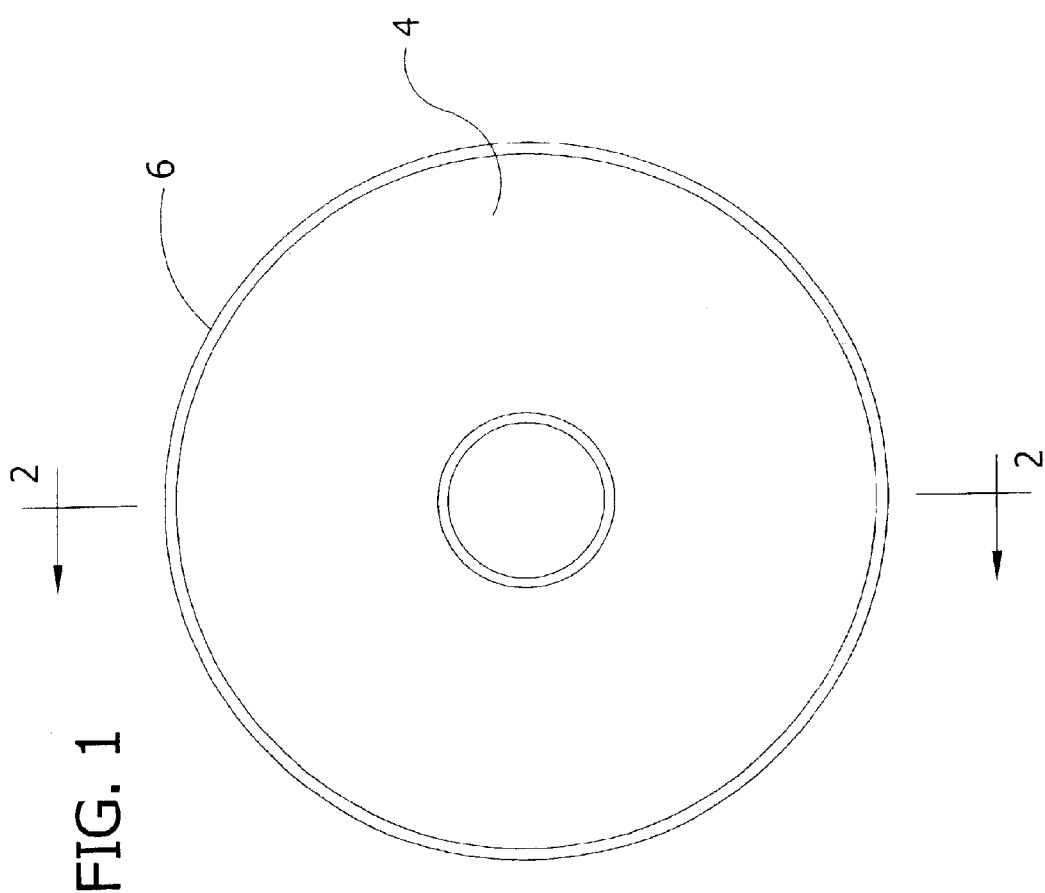

ULTRASONIC ROTARY HORN REPAIR

BACKGROUND OF INVENTION

This invention relates to repair of an ultrasonic rotary horn.

Ultrasonic rotary horns are used to distribute ultrasonic energy in a variety of industrial processes. One example involves bonding of two thermoplastic sheets of material together in the manufacture of personal care products such as diapers. Other examples involve perforating; and other examples involve shape cutting.

An ultrasonic rotary horn may, for example, be manufactured from a titanium-based material such as commercially pure titanium or a titanium alloy (e.g., Ti6Al4V). In other apparatus it may be manufactured from, for example, aluminum-based materials, monel, or some alloy steels. An ultrasonic rotary horn may in certain circumstances work in conjunction with a hard or aggressive anvil, such as a metal anvil, with a work piece between a radial energy transfer surface of the horn and the anvil. Over time, contact between the energy transfer surface and the anvil and/or between the energy transfer surface and the work piece can cause abrasive wear and deformation on the radial energy transfer surface of the horn. These deteriorated conditions can detract from the efficiency of energy transfer to work piece, and can cause imperfect bonding, perforating, shape cutting, or other work being performed on the work piece.

Periodically, wear on the radial energy transfer surface must be addressed by machining worn metal from the radial energy transfer surface. After one or more such machining operations, the horn diameter has been reduced by metal removal to a point where the diameter is below minimum specifications, and the horn must be scrapped. As the horn diameter is reduced, the resonant frequency rises to a value which is too high.

SUMMARY OF THE INVENTION

In response to the above difficulties and problems, the invention provides for repair of ultrasonic rotary horns to restore the radial energy transfer surface without significantly reducing the horn diameter, thereby reducing the frequency with which horns must be scrapped.

Briefly, therefore, the invention is directed to a method for repairing a radial energy transfer surface of an ultrasonic rotary horn comprising a shaped metal horn body and the radial energy transfer surface with a deteriorated metal condition thereon. A radial depth of metal having a deteriorated metal condition is removed from the radial surface of the horn to yield a reduced-diameter ultrasonic rotary horn having a radial surface free from the deteriorated metal condition. A metal powder is applied to the radial surface free from the deteriorated metal condition to yield an ultrasonic rotary horn having a radial surface free from deteriorated metal condition and with metal powder thereon. The ultrasonic rotary horn having the radial surface free from deteriorated metal condition and with metal powder thereon is hot isostatically pressed to consolidate the metal powder and fuse the metal powder to the radial surface to yield a repaired radial energy transfer surface comprising consolidated metal fused to the radial surface free from the deteriorated metal condition.

The invention is also directed to a repaired ultrasonic rotary horn having a shaped metal horn body, and a radial energy transfer surface comprising consolidated metal powder fused to a radial surface of the shaped metal horn body by hot isostatic pressing such that the consolidated metal powder has a density of at least about 95% of a theoretical density of the consolidated metal powder.

Other features and advantages will be in part apparent and in part pointed out hereinafter.

BRIEF DESCRIPTION OF THE FIGURES

FIG. 1 is a schematic representation end view of an ultrasonic rotary horn.

FIG. 2 is schematic representation of the ultrasonic rotary horn of FIG. 1 in cross-section taken along line A—A.

DETAILED DESCRIPTION OF THE INVENTION

Figure 3:
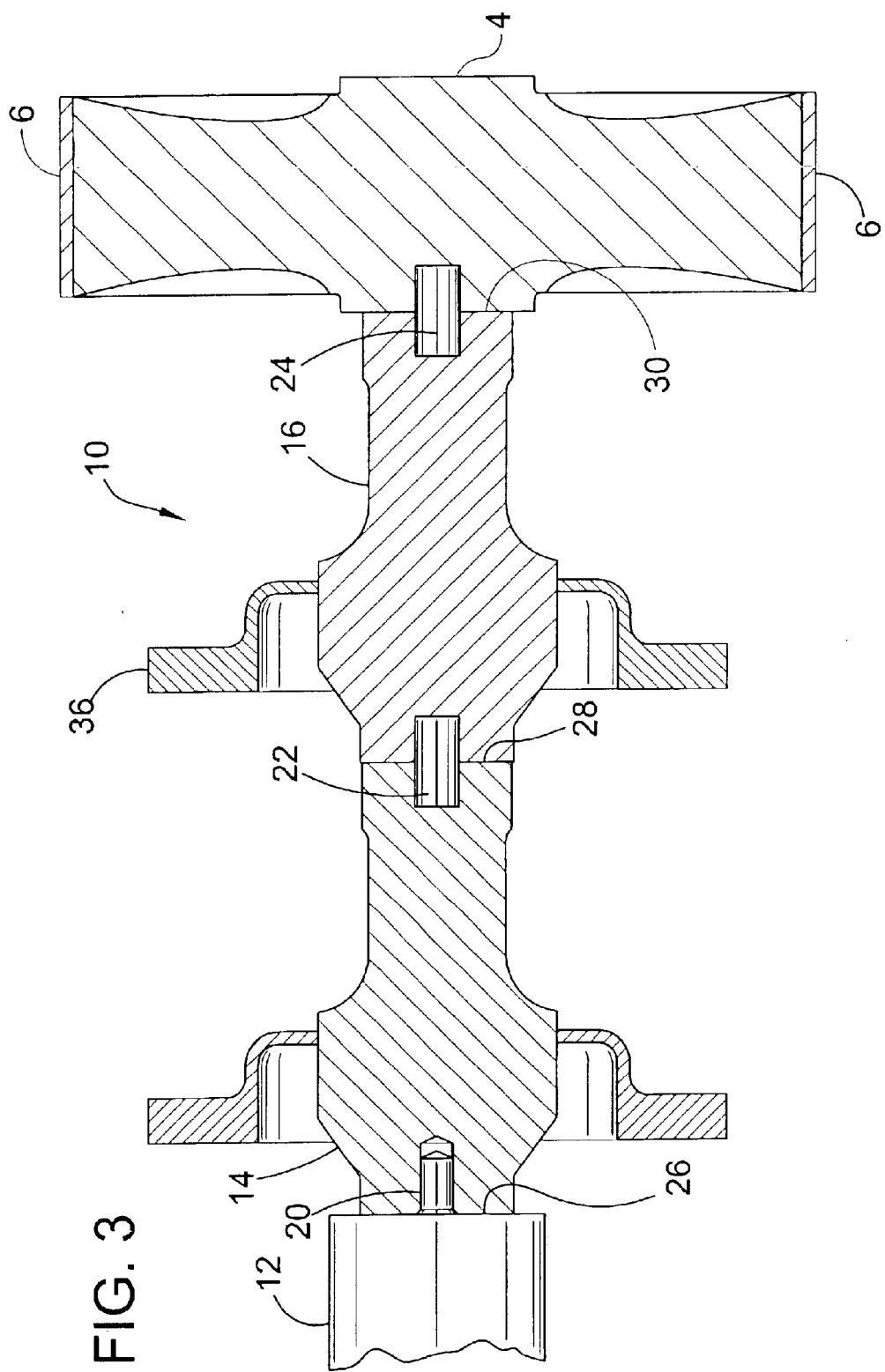
FIG. 3 is a schematic representation of an ultrasonic rotary horn assembly.

The present invention provides a repaired ultrasonic rotary horn component of an ultrasonic rotary horn assembly for any of a variety of manufacturing operations, such as for bonding at least two continuously moving substrate webs together. The horn and assembly are particularly useful for ultrasonically bonding selected components to absorbent articles. Alternatively, the horn and assembly are useful for bonding two webs together to form a composite material and subsequently using it as a component in an absorbent article such as, for example, a disposable diaper.

The present invention is particularly useful in the bonding of two or more layers of materials which in certain aspects can be made, at least in part, from thermoplastic polymers. In particular, the horn and assembly can be used to ultrasonically bond stretchable outer ears to a disposable diaper using a rotary ultrasonic horn. The stretchable outer ears enhance the fit of the diaper about the waist of the wearer. The horn and assembly may also be used to bond a fastening system to the outer ears of the diaper. In addition, it should be readily understood that the horn and assembly may be used in the manufacture of other types of articles, such as, for example, training pants, feminine care products, incontinence garments, hospital gowns, and the like. All of such alternative configurations are contemplated as being within the scope of the present invention. The present invention may also be, for example, a repaired ultrasonic rotary horn configured to selectively perforate a material, or to selectively cut shapes from a material.

The invention can be performed on an ultrasonic rotary horn which comprises a shaped metal horn body and a radial energy transfer surface on the horn body. The radial energy transfer surface has a deteriorated metal condition thereon resulting from in-service wear and/or deformation. This condition results from operation of the horn over time, as the energy transfer surface repeatedly acts on the work piece and/or against the anvil. Whether there is full and direct contact between the horn energy transfer surface and the anvil varies from operation to operation. In any event the energy transfer surface is subjected to distress and/or deterioration over time. In one aspect this may constitute abrasive wear resulting from repeated contact of the energy transfer surface with the work piece and/or the anvil at the operating location where the work is performed, and by movement of the work piece between the transfer surface and the anvil. In another aspect this may constitute plastic deformation of the horn surface due to impact loading of patterns on the anvil against the horn. Each of these phenomena can be characterized by features which may include surface roughness, which detracts from the quality of work performed by the horn. The horn is resurfaced when the work performed thereby significantly deteriorates, for example, when product bond strength drops or visual quality is degraded.

A radial depth of metal which comprises the deteriorated metal condition is removed from the radial energy transfer surface to yield a reduced-diameter ultrasonic rotary horn having a radial surface free from the deteriorated metal condition. In one embodiment, this removal can be removal of a radial depth of metal of between about 0.15 inches (0.4 cms) and about 0.25 inches (0.65 cms). The specific depth of removal is selected to be at least deep enough to ensure that the entirety of the deteriorated metal condition is removed, while not so deep as to involve needless removal of material not affected by the deteriorated metal condition. Material is removed from an arcuate segment which at least encompasses the deteriorated metal condition. In one aspect the deteriorated metal condition affects the entire periphery of the horn and material is removed around the entire periphery.

In one alternative the removal of the depth of metal can be accomplished mechanically. For example, the horn is mounted on a lathe and material is machined off the radial surface of the horn using a carbide tipped tool. Any residual loose metal chips or shavings are then blown off using compressed air.

A metal powder is then applied to the radial surface free from the deteriorated metal condition to yield an ultrasonic rotary horn having a radial surface free from deteriorated metal condition and with metal powder thereon. The application of the metal powder to the radial surface can be accomplished by placing a can such as a mild steel 16 gauge can around the radial surface of the horn with a gap between the can and the radial surface. The gap is then filled with metal powder and the can is sealed to provide an ultrasonic rotary horn having the radial surface free from deteriorated metal condition and with metal powder thereon. In one embodiment the metal powder has the same metallurgical composition as the horn body. For example, where the horn body is formed from a titanium-based material such as Ti6Al4V, the metal powder applied in this operation may also be Ti6Al4V. In an alternative embodiment the metal powder has a metallurgical composition which is distinct from the metallurgical composition of the horn body. For example, where the horn body is formed from a titanium-based material such as Ti6Al4V, the metal powder applied in this operation may be a metal powder which has wear or strength characteristics distinct from the wear or strength characteristics of the horn body. The horn body material may therefore be titanium-based and the metal powder non-titanium based or titanium-based. For example, the horn body may be titanium-based and the applied material may be a more wear-resistant material. Or the horn body material may be non-titanium-based and the metal powder titanium-based or non-titanium-based. The alternative material is selected such that it has acoustic characteristics compatible with ultrasonic horn operation, and such that it has bonding characteristics compatible with the horn body material, i.e., it readily forms a strong fusion bond with the horn body material.

After application of the metal powder to the radial surface, the ultrasonic rotary horn having the radial surface free from deteriorated metal condition and with metal powder thereon is hot isostatically pressed to consolidate the metal powder and fuse the metal powder to the radial surface. This yields a repaired radial energy transfer surface comprising consolidated metal fused to the radial surface free from the deteriorated metal condition. The hot isostatic pressing operation can be carried out employing a pressure vessel which can be pressurized employing a gas, such as argon, of commercial quality to apply a pressure equally over the entire surface area of the horn body. The pressure, in combination with the elevated temperature employed, effects consolidation of the metal powder to a density greater than 95% of theoretical density, and even about 100% of theoretical density. These conditions also effect fusion bonding of the metal powder to the horn body radial surface causing them to become totally integrated to a density of at least about 95%, and in particular aspects, about 100%, of the theoretical density at the interface between the horn body and the radial surface. In still more particular aspects, the fusion bonding of the metal powder to the horn body radial surface may have a density of 100% of theoretical density. It will be appreciated that the horn body thereby has a new radial energy transfer surface solidly adhered thereto completely by fusion bonding, and free from mechanical fastening or other joining mechanism.

For the hot isostatic pressing, a pressure suitable for use in this operation can be, for example, about 16 ksi. The temperature employed in this operation can be in the range of about 1500 F. (about 815 C.) to about 1600 F. (about 870 C.). The duration of the hot isostatic pressing step depends upon the temperature and pressure selected. As a general proposition, when the pressure is 16 ksi and the temperature is in the range of about 1500 F. (about 815 C.) to about 1600 F. (about 870 C.), the process may employ a time period of about 1.5 hrs to about 3 hrs, for example 2 hrs, in one embodiment. At the conclusion of the hot isostatic pressing step, the horn body having the repaired radial energy transfer surface comprising consolidated metal fused to the radial surface is cooled and removed from the pressure vessel. The can is removed from around the horn. FIGS. 1 and 2 illustrate the resulting product, i.e., a repaired radial energy transfer surface comprising consolidated metal powder 6 fused to the radial surface of the horn body 4.

FIG. 3 schematically illustrates an ultrasonic rotary horn assembly 10 having a number of stack components including a converter 12, a secondary booster 14, a primary booster 16, isolation ring shells 36, and horn 4. Alternatively, the assembly may employ, no boosters, one booster, or more than two boosters. Connectors 20, 22, and 24 connect the various stack components at interfaces 26, 28, and 30.

In general, the ultrasonic rotary horn 4 may be made from any metal having suitable acoustical and mechanical properties. Suitable metals include titanium-based materials such as commercially pure titanium and titanium alloys such as Ti6Al4V, aluminum-based materials, monel, and some alloy steels. In general, variables such as the diameter, mass, width, thickness and configuration of the ultrasonic rotary horn 4 are not critical. However, the variables do determine the particular frequency and amplitude at which the ultrasonic horn resonates and vibrates. Variables such as the diameter, mass, width, thickness and configuration of the ultrasonic rotary horn 2 or other component are not narrowly critical. However, physical variables do determine the particular frequency and amplitude at which the ultrasonic horn resonates and vibrates. In particular, the physical variables of an ultrasonic horn, such as diameter, mass, thickness, overall configuration etc. may be selected such that the device resonates in a gravest mode, i.e., a fundamental resonant mode under a given set of conditions, at a particular frequency and with a desired amplitude. For example, it is known that vibration in the gravest mode at a desired frequency is achieved by adjusting physical parameters, and it is known that gain, i.e., ratio of output amplitude to input amplitude, can be adjusted by adjusting physical parameters.

The ultrasonic rotary horn 4 is intended to be excited at a frequency of from about 15 to about 60 kHz. One specific embodiment is designed for operation at 20 kHz. The horn may have, for example, a diameter of from about 4 to about 20 centimeters and a width at the bonding surface of from about 0.6 to about 13 centimeters. The thickness of the horn at the rotational axis may be from about 0.06 to about 15 centimeters. The horn may have a mass in the range of from about 0.06 to about 30 kilograms. The diameter, width, and thickness of the horn are selected such that the horn, upon being excited by ultrasonic energy at a desired frequency, is adapted to resonate such that the excited end moves substantially in phase with the movement of the source of excitation and the opposed end and bonding surface move substantially out of phase with the excited end. Thus, upon subjecting the horn to ultrasonic excitation, the excited end moves in a direction towards the interior of the horn while the opposing end and the bonding surface move in the opposite direction which is also towards the interior of the horn. As such, the movements of the ends of the horn relative to each other are said to be out of phase. Ultrasonic energy is delivered to an operating location, which is at the radial energy transfer surface on the periphery of the horn which acts in conjunction with an anvil to perform work on the work piece.

The ultrasonic horn assembly 10 also includes a drive mechanism or converter 12 to ultrasonically excite the ultrasonic horn 4. Any mechanism which provides the desired excitation can be used in the present invention. Such mechanisms are well known to those skilled in the art. For example, the assembly may include a drive mechanism that is commercially available from Dukane Corporation located in St. Charles, Ill. or a similar system available from Branson Sonic Power Company located in Danbury, Conn. Typically, a generator, such as a Dukane 3000 watt, 20 kHz generator (Part No. 20A3005), is connected to a driver assembly, such as a Dukane driver assembly (Part No. 110-3716-0001), to provide the necessary ultrasonic excitation. Any combination of boosters 14 and 16, such as a Dukane 1:1 booster (Part No. 110-2510) and a Dukane 1.5:1 booster (Part No. 110-2512), may then be attached to the driver assembly. Finally, the ultrasonic rotary horn is attached to the boosters. In an alternative embodiment, the primary booster may be formed integrally with the horn, such that the horn and booster are manufactured as a single piece. Thus, the combination of the generator, drive assembly, and boosters ultrasonically excites the ultrasonic horn thereby providing the ultrasonic energy necessary to bond the substrate webs together, perforate a substrate, or otherwise carry out the desired operation.

The assembly also includes an anvil (not shown) with which the horn acts, with the work piece there between. The anvil may be a stationary anvil, or may optionally be a rotating anvil roll as in the case of a rotating ultrasonic horn as described in U.S. Pat. Nos. 5,087,320, 5,096,532, 5,110,403, and 5,552,013 (all hereby incorporated by reference). The rotating anvil roll has an outer peripheral anvil surface located adjacent the radial energy transfer surface of the horn 4. The anvil roll is configured to rotate about an anvil axis in a direction such that its bonding surface moves in the direction in which the work piece travels. In one specific bonding operation, substrate webs continuously move between the energy transfer face of the horn and the anvil.

Upon energization the ultrasonic horn cyclically expands and contracts, which expansion and contraction is the driving force for the bonding or other mechanical operation performed by the horn. For example, the horn expands and contracts a total amplitude of about 0.003 inches (0.0075 cms) at a frequency of 20,000 cycles per second. This translates to a total movement of about 120 inches (300 cms) of movement per second. This movement corresponds to an energy value applied to the work piece traveling between the horn's energy transfer surface and the anvil. Some of the energy is simply returned as elastic reaction, and most of the energy is dissipated as heat, which heats or melts two plastic materials being processed.

As various changes could be made in the above-described horn assembly without departing from the scope of the invention, it is intended that all matter contained in the above description be interpreted as illustrative and not in a limiting sense.

What is claimed is:

1. A method for repairing a radial energy transfer surface of an ultrasonic rotary horn comprising a shaped metal horn body and the radial energy transfer surface with a deteriorated metal condition thereon, the method comprising:

removing from the radial energy transfer surface a radial depth of metal which comprises the deteriorated metal condition to yield an ultrasonic rotary horn having a radial surface free from the deteriorated metal condition;

applying a metal powder to the radial surface free from the deteriorated metal condition to yield an ultrasonic rotary horn having a radial surface free from deteriorated metal condition and with metal powder thereon; and hot isostatically pressing the ultrasonic rotary horn having the radial surface free from deteriorated metal condition and with metal powder thereon to consolidate the metal powder and fuse the metal powder to the radial surface to yield a repaired radial energy transfer surface comprising consolidated metal fused to the radial surface free from the deteriorated metal condition.

2. The method of claim 1 wherein the consolidated metal powder has a composition which is the same as composition of the horn body.

3. The method of claim 2 wherein the composition of the consolidated metal powder is titanium-based.

4. The method of claim 2 wherein the composition of the metal powder is Ti6Al4V.

5. The method of claim 1 wherein the consolidated metal powder has a composition which is distinct from a composition of the horn body.

6. The method of claim 5 wherein the consolidated metal powder composition in titanium-based and the composition of the horn body is titanium-based.

7. The method of claim 5 wherein the consolidated metal powder composition is titanium-based and the composition of the horn body is not titanium-based.

8. The method of claim 5 wherein the consolidated metal powder composition is not titanium-based and the composition of the horn body is titanium-based.

9. The method of claim 1 wherein removing the radial depth of metal comprises machining.

10. The method of claim 1 wherein removing the radial depth of metal comprises removing a depth between about 0.15 inches and about 0.25 inches.

11. The method of claim 1 wherein the consolidated metal powder is adhered to the radial surface completely by fusion bonding free from mechanical fastening or other joining mechanism.

12. The method of claim 1 wherein the consolidated metal has a density which is at least about 95% of a theoretical density for the consolidated metal.

13. A repaired ultrasonic rotary horn comprising:

a shaped metal horn body; and a radial energy transfer surface comprising consolidated metal powder fused to a radial surface of the shaped metal horn body by hot isostatic pressing such that the consolidated metal powder has a density of at least about 95% of a theoretical density of the consolidated metal powder.

14. The repaired ultrasonic rotary horn of claim 13 wherein the consolidated metal powder fused to a radial surface of the shaped metal horn body has a radial depth between about 0.15 inches and about 0.25 inches.

15. The repaired ultrasonic rotary horn of claim 13 wherein the consolidated metal powder has a composition which is the same an composition of the horn body.

16. The repaired ultrasonic rotary horn of claim 15 wherein the composition of the consolidated metal powder is titanium-based.

17. The repaired ultrasonic rotary horn of claim 16 wherein the composition of the metal powder is Ti6Al4V.

18. The repaired ultrasonic rotary horn of claim 13 wherein the consolidated metal powder has a composition which is distinct from a composition of the horn body.

19. The repaired ultrasonic rotary horn of claim 18 wherein the consolidated metal powder composition is titanium-based and the composition of the horn body is titanium-based.

20. The repaired ultrasonic rotary horn of claim 18 wherein the consolidated metal powder composition is titanium-based and the composition of the horn body is not titanium-based.

21. The repaired ultrasonic rotary horn of claim 18 wherein the consolidated metal powder composition is not titanium-based and the composition of the horn body is titanium-based.

22. The repaired ultrasonic rotary horn of claim 14 wherein the consolidated metal powder is adhered to the radial surface completely by fusion bonding free from mechanical fastening or other joining mechanism.

23. The repaired ultrasonic rotary horn of claim 13 wherein the consolidated metal powder has a density of at least about 100% of a theoretical density of the consolidated metal powder.

* * * * *